United States Patent

[11] 3,585,750

| [72] | Inventor | Henry Arthur Routt<br>Dundas, Ill. 62425 |
|---|---|---|
| [21] | Appl. No. | 810,984 |
| [22] | Filed | Mar. 27, 1969 |
| [45] | Patented | June 22, 1971 |

[54] ANIMAL TRAP
1 Claim, 8 Drawing Figs.
[52] U.S. Cl. .................................................. 43/61
[51] Int. Cl. ............................................... A01m 23/20
[50] Field of Search ........................................ 43/61

[56] References Cited
UNITED STATES PATENTS

| 383,972 | 6/1888 | Mittler | 43/61 |
| 1,054,564 | 2/1913 | Kline | 43/61 |
| 1,158,185 | 10/1915 | Danielson | 43/61 |
| 1,522,375 | 1/1925 | Kruszynski | 43/61 |
| 1,759,048 | 5/1930 | Fisher | 43/61 |
| 2,163,961 | 6/1939 | Pendry | 43/61 |

*Primary Examiner*—Warner H. Camp

ABSTRACT: A hollow housing has an elongated slot in the top wall and is provided with a sliding door at each end. A notched support is detachably mounted on the top wall adjacent each door. A lever is pivotally mounted on each support and each lever is connected adjacent one end thereof to a door. One of the levers has an inverted hook for engaging the other lever and a notched trigger. The trigger extends through the elongated slot and is releasably held in position by the engagement of the notch therein with a bar projecting partially across the slot. A burrow enclosure extends from one end of the housing.

PATENTED JUN 22 1971

INVENTOR.
Henry Arthur Routt

PATENTED JUN22 1971 3,585,750

INVENTOR.
Henry Arthur Routt

ANIMAL TRAP

Some animals cannot be captured with either metal traps or with wooden traps having one end closed or covered with something that obstructs their view, therefore my invention is directed toward a novel animal trap particularly adapted for trapping groundhogs (or woodchucks). However it may be made in different sizes with a number of variations, and be used for trapping fur bearing and other animals.

Accordingly it is an object of my invention to provide a new and improved animal trap that may be set in bramble and out-of-way places, or it may be used in or near farm buildings without danger of it injuring livestock, poultry, valuable pets, or small children.

Another object is to provide a new and improved animal trap that is easy to operate and to transport from place to place with a captured uninjured live animal trapped therein.

Another object is to provide a new and improved animal trap having no parts activated by springs or counterweights, or having any part that is likely to arouse an animal's suspicion, yet is so constructed that it is easy to clean but is very difficult for a captured animal to damage or to escape from.

Yet another object is to provide a new and improved animal trap that is more efficient, being so made that an unwanted captured skunk can be seen and set free without the operator being sprayed in the face with its odoriferous secretion.

Still another object is to provide an improved animal trap of the character indicated which can be manufactured inexpensively and can be made ready for moving quickly and easily.

All of the foregoing and still further objects and advantages of my invention will now be explained with reference both to this specification and to the accompanying drawings wherein.

Figure 2:
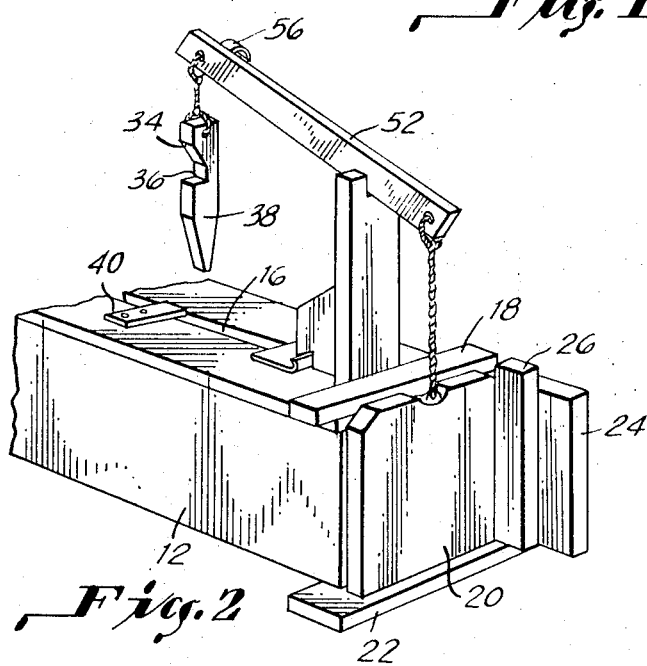
FIG. 2 is a partial view showing one of the trap doors in a closed position, with one of the extension blocks having been removed.
Figure 5:
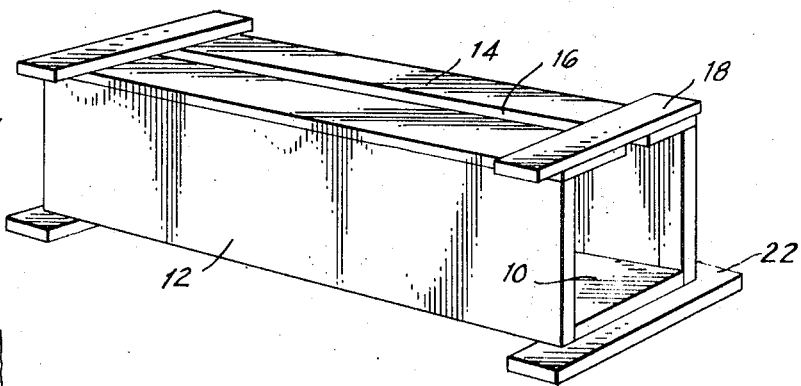
FIG. 5 is a detail view of the body of the trap.

Referring to the drawings 8—8, there is shown an elongated unobstructed hollow structure FIG. 5, known as the body of the trap having a floor 10, a pair of spaced apart sidewalls 12, and a ceiling 14 having a longitudinally extending horizontal slot 16; said ceiling being joined at each of its ends on its top side by a separate transverse horizontal crosspiece 18; and said body of the trap also having a separate transverse horizontal crosspiece 22 secured to the underneath part of each end of said floor, with said horizontal crosspiece extending beyond the ends of said floor for the trap doors 20 and 32 to rest on when the said doors are in a closed position as shown in FIG. 2.

Figure 1:
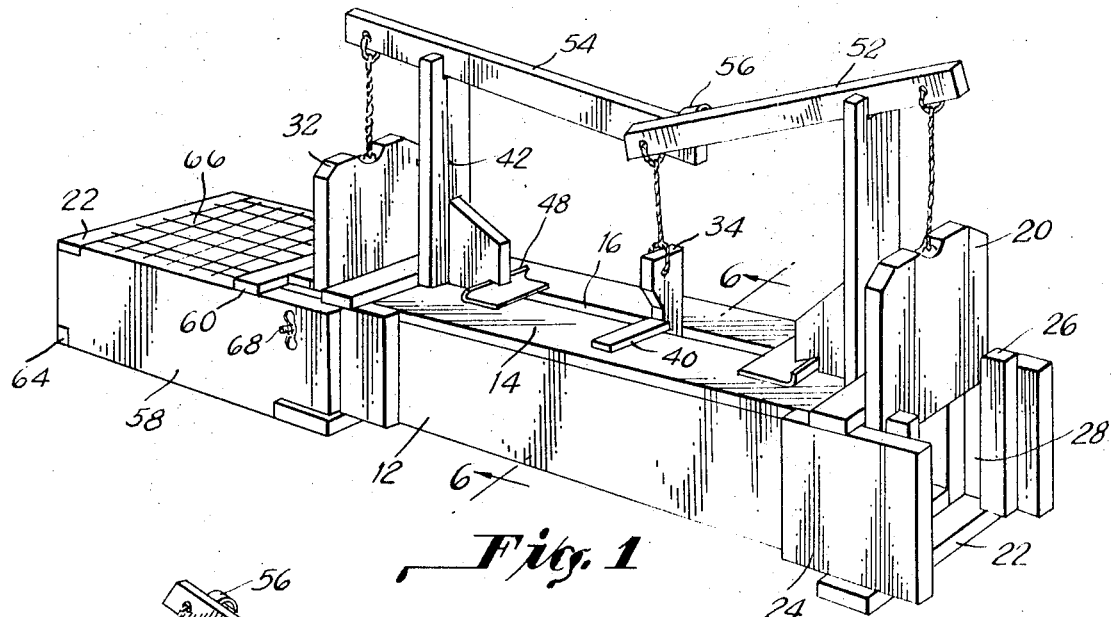
FIG. 1 is a perspective view of my invention, showing the trap in a set or animal admitting position.

Cleats placed inside the body of a trap are often damaged or destroyed by a captured animial. In order to prevent such and at the same time provide grooves for the trap doors to slide in, each end of each sidewall 12 carry a separate extension block 24 having a vertical cleat 26, with said vertical cleat and the adjoining end of said sidewall spaced apart defining a vertical groove 28 therebetween adapted to accommodate either of the trap doors 20 or 32; said trap doors being of the same size and shape, and being unattached to the said body of the trap, either door may be placed at either end of said body of the trap when the trap is set in an animal admitting position as shown in FIG. 1.

If the body of the trap is made of wood, the boards comprising the floor, the sidewalls, and the ceiling are all of the same length; said ceiling having a metal shield 30 secured to its inner edges to protect said inner edges.

The longitudinally extending horizontal slot 16 permits both light and air to enter the body of the trap; enables a captured animal within to be seen; and provides a place for the trigger 34 to function; said trigger having a transverse notch 36, and extends vertically through horizontal slot 16 down into the body of the trap where a depending portion 38 below said notch is engageable by an animal.

Figure 6:
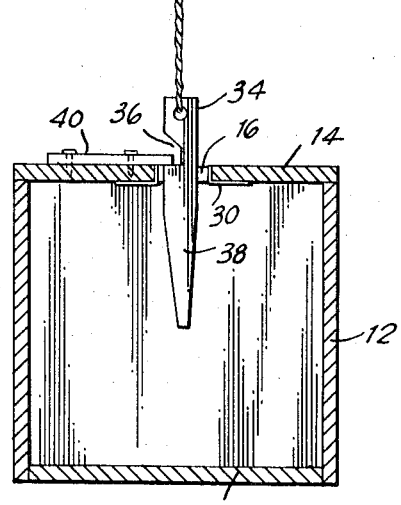
FIG. 6 is a view through 6—6 of FIG. 1.
Figure 7:
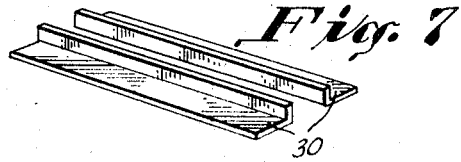
FIG. 7 is a view of the shield used to protect the inner edges of the ceiling.

A trigger engaging bar 40 extending partly across the horizontal slot 16 in transverse relation thereto, terminates at an end; said bar end engages notch 36 as shown in FIG. 6 when the trap is in an animal admitting position.

Figure 3:
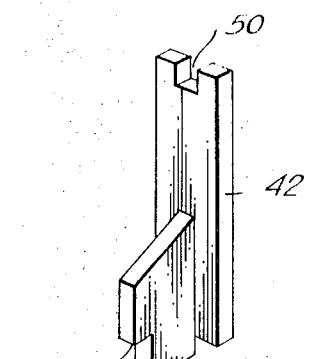
FIG. 3 is a detail view of one of the vertical supports.

A pair of spaced apart vertical supports 42 extend upwardly from the ceiling 14; each vertical support having near its lower end, a transverse notch 44, shown in FIG. 3, and having below said notch a depending portion 46 which is placed between one of the horizontal crosspieces 18 and one of the metal plates 48 secured to said ceiling and with the lower part of said depending portion inserted into horizontal slot 16, holds said vertical support in position.

At its top end each vertical support 42 has a vertical groove 50 wherein either of the levers 52 or 54 can be pivotally mounted when the trap is being set in an animal admitting position.

Figure 4:
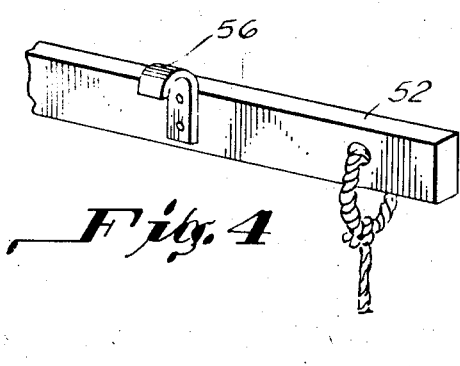
FIG. 4 is a detail view of a portion of the trigger mechanism.

At its outer end lever 52 is connected by chain or cord to the top part of door 20; at its inner end said lever is connected by chain or cord to the trigger 34; at its outer end lever 54 is connected by chain or cord to door 32; while the trap remains in an animal admitting position, the inner end of lever 54 rests in an inverted hook 56 secured to lever 52; said inverted hook is shown in FIG. 4.

When setting the trap in an animal admitting position, the doors 20 and 32, the levers 52 and 54, and the trigger 34 should be placed in position as shown in FIG. 1, with the end of trigger engaging bar 40 engaging notch 36 as shown in FIG. 6.

When an animal enters the body of the trap and engages the depending portion 38 of the trigger, notch 36 moves out of engagement with the inner end of the trigger engaging bar 40, the inner ends of both levers 52 and 54 move upwardly and apart, and the doors 20 and 32 move downwardly simultaneously under the influence of gravity into a closed or animal capturing position.

In FIG. 1 the trap is shown having a burrow enclosure attached to one end that can be placed over the entrance to an animal's den to guide the animal into the body of the trap as it comes up out of its den. The said burrow enclosure has a pair of spaced apart sidewalls 58 joined on the top at their inner end by a transverse crosspiece 60 and joined at their outer end by transverse crosspieces 62 and 64, and having the ceiling and outer end covered with an animal retaining material 66. Said burrow enclosure being fastened to the trap with a bolt 68, can be easily and quickly removed when not needed. The trap is so made that the said burrow enclosure can be attached to either of its ends.

If so desired, the trap may be set with door 32 left closed. An animal may enter the trap at either end. If an unwanted animal is captured, one or both of the doors can be lifted out of the grooves 28 and the animal permitted to leave the trap unharmed.

Figure 8:
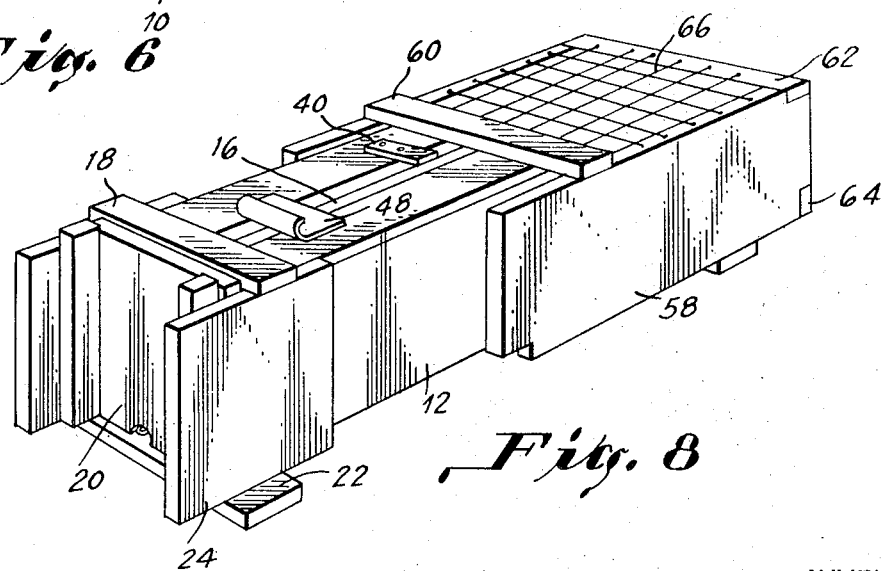
FIG. 8 is a perspective view of the trap in a nested or ready to move position.

When nesting the trap for moving or for storing, the vertical supports 42 are first placed inside the body of the trap, then the trigger 34 and levers 52 and 54 still connected to the doors are placed inside the body of the trap, then the doors turned up-side-down are placed in the grooves 28 and the burrow enclosure positioned as shown in FIG. 8.

Different kind of material may be used for making my invention. It may be made in different sizes having a number of variations without departing from the spirit or scope of the invention.

Having thus described my invention, what I claim as new and desire to secure by Letters Patent is as follows:

1. An animal trap comprising: an elongated unobstructed hollow housing having a pair of spaced apart sidewalls, a floor, a ceiling and a door at each end thereof; said sidewalls having at each end thereof a separate extension block provided with a vertical cleat, said vertical cleat and the adjoining end of said sidewall being spaced apart to define a vertical groove therebetween slidably accommodating said doors; said ceiling having a longitudinally extending horizontal slot; a trigger having a transverse notch, said trigger extending vertically through said horizontal slot and having a depending portion below said notch that is engageable by an animal; a trigger engaging bar extending partly across an intermediate portion of said horizontal slot in transverse relation thereto, said bar engaging said trigger notch when said trap is in an animal admitting position; a notched vertical support detachably mounted on each end of said ceiling; a lever pivotally mounted in the notch of each said notched support, each said lever being connected at one end thereof to a separate door, intermediate its ends one of the levers being provided with an inverted hook contacting the other end of the other lever when said trap is open, said trigger being connected to the other end of the lever provided with the said inverted hook so that upon engagement of said depending portion by an animal, said trigger notch moves out of engagement with said bar and said doors move downwardly simultaneously under the influence of gravity into an animal capturing position; and a burrow enclosure beyond one of said doors.